United States Patent
Dehais et al.

(10) Patent No.: US 9,002,542 B2
(45) Date of Patent: Apr. 7, 2015

(54) METHOD AND DEVICE FOR DETECTING PILOTING CONFLICTS BETWEEN THE CREW AND THE AUTOPILOT OF AN AIRCRAFT

(75) Inventors: Frédéric Dehais, Toulouse (FR); Charles Lesire, Toulouse (FR); Catherine Tessier, Toulouse (FR); Laure Christophe, Colombiers (FR)

(73) Assignee: Airbus Operations (SAS), Toulouse Cedex (FR)

( * ) Notice: Subject to any disclaimer, the term of this patent is extended or adjusted under 35 U.S.C. 154(b) by 106 days.

(21) Appl. No.: 12/994,612

(22) PCT Filed: Jun. 4, 2009

(86) PCT No.: PCT/FR2009/000648
§ 371 (c)(1),
(2), (4) Date: Nov. 24, 2010

(87) PCT Pub. No.: WO2010/000960
PCT Pub. Date: Jan. 7, 2010

(65) Prior Publication Data
US 2011/0077803 A1    Mar. 31, 2011

(30) Foreign Application Priority Data
Jun. 9, 2008 (FR) .................................... 08 03189

(51) Int. Cl.
*G05D 1/00*  (2006.01)

(52) U.S. Cl.
CPC ................ *G05D 1/0055* (2013.01); *G05D 1/00* (2013.01)

(58) Field of Classification Search
USPC ............. 701/3, 4, 8–12; 340/976; 342/29–35, 342/41, 147, 357.23, 357.24; 244/17.13, 244/76 R, 175, 221
See application file for complete search history.

(56) References Cited

U.S. PATENT DOCUMENTS

| | | | | |
|---|---|---|---|---|
| 4,839,658 | A | * | 6/1989 | Kathol et al. .................. 342/455 |
| 4,924,401 | A | * | 5/1990 | Bice et al. ......................... 701/6 |
| 5,335,177 | A | * | 8/1994 | Boiteau et al. .................. 701/14 |

(Continued)

OTHER PUBLICATIONS

Written Opinion of the International Searching Authority, opinion completed Oct. 8, 2009 by the European Patent Office, for International Application No. PCT/FR2009/000648.

*Primary Examiner* — Thomas Tarcza
*Assistant Examiner* — Tyler J Lee
(74) *Attorney, Agent, or Firm* — Novak Druce Connolly Bove + Quigg LLP

(57) ABSTRACT

A method for detecting piloting conflicts between the crew and the autopilot of an aircraft. According to the method, an automatic trajectory is programmed by checking whether the actual values of navigation parameters converge on said corresponding desired values within a predetermined convergence period; in the case where at least one of the actual values does not converge, within the convergence period, on the corresponding desired value, a predictive calculation is carried out, at consecutive future moments, of the value of at least one particular parameter selected amongst the navigation parameters; and in the case where the predicted value of the particular parameter is higher than a corresponding predefined threshold, an alarm is emitted for the crew of the aircraft to notify them about a piloting conflict being able to jeopardize the flight safety of the aircraft. A device for implementing the method. An aircraft including the device.

4 Claims, 2 Drawing Sheets

(56) References Cited

U.S. PATENT DOCUMENTS

| | | | | |
|---|---|---|---|---|
| 5,488,563 | A | 1/1996 | Chazelle et al. | |
| 5,629,848 | A * | 5/1997 | Repperger et al. | 701/14 |
| 5,663,732 | A * | 9/1997 | Stangeland et al. | 342/357.31 |
| 6,178,379 | B1 * | 1/2001 | Dwyer | 701/9 |
| 6,199,028 | B1 * | 3/2001 | Repperger et al. | 702/189 |
| 6,421,603 | B1 * | 7/2002 | Pratt et al. | 701/528 |
| 6,438,492 | B1 * | 8/2002 | Le Tallec et al. | 701/301 |
| 6,480,120 | B1 * | 11/2002 | Meunier | 340/970 |
| 7,088,264 | B2 * | 8/2006 | Riley | 340/963 |
| 7,346,437 | B2 * | 3/2008 | Petillon | 701/3 |
| 7,400,951 | B2 | 7/2008 | Artini et al. | |
| 7,844,373 | B2 * | 11/2010 | Deker | 701/14 |
| 2006/0109166 | A1 * | 5/2006 | Arthur et al. | 342/29 |
| 2006/0235581 | A1 * | 10/2006 | Petillon | 701/3 |
| 2008/0161982 | A1 * | 7/2008 | Coulmeau et al. | 701/3 |
| 2009/0027253 | A1 * | 1/2009 | van Tooren et al. | 342/29 |
| 2009/0254278 | A1 * | 10/2009 | Wang | 701/216 |

* cited by examiner

METHOD AND DEVICE FOR DETECTING PILOTING CONFLICTS BETWEEN THE CREW AND THE AUTOPILOT OF AN AIRCRAFT

CROSS-REFERENCE TO RELATED APPLICATIONS

This application is a §371 national stage entry of International Application No. PCT/FR2009/000648, filed Jun. 4, 2009, which claims priority to French Patent Application 08/03189, filed Jun. 9, 2008, the entire contents of which are incorporated herein by reference.

FIELD OF THE INVENTION

The present invention relates to a method and a device for detecting piloting conflicts between the crew and the autopilot of an aircraft, being able to jeopardize the flight safety of said aircraft, as well as an aircraft provided with such a device.

BACKGROUND OF THE INVENTION

As known, most aircrafts, including civil transport airplanes, are provided with an autopilot enabling to check the trajectory and the speed according to instructions pre-established by the crew. Such an autopilot is a finite state automaton, each state corresponding to a particular piloting mode for the piloting control in the vertical plane and in the horizontal plane as well as for the speed holding.

It is further known that switching from one piloting mode to another one is generally achieved by a voluntary action of the crew on the control interfaces of the autopilot.

It is also known that, because of the existence of strong interactions between the different piloting modes, a simple action of the crew on the control interfaces of the autopilot could result in a cascade of mode transitions for the latter, such a cascade having consequences on the piloting control in the vertical plane and in the horizontal plane as well as on the speed holding of the aircraft.

Moreover, a voluntary action of the crew on other piloting controls (for instance the control lever of the airbrakes) than those associated with the autopilot, can also trigger mode transitions of the autopilot.

In some conditions, mode transitions can also occur automatically with no voluntary action of the crew, in order to protect the aircraft against flight field excursions.

Whatever the cause of the changes of piloting modes of the autopilot, the crew is notified about it by one or more visual alarms on the piloting interfaces, as well as by sound alarms.

Now, despite such visual and sound alarm systems, the crews may not become aware of at least one mode change of the autopilot of the aircraft (for instance because of a high or particularly stressful work load) and continue to act as if the autopilot was still in the desired piloting mode.

Moreover, even warned, the crews, being generally unaware of the triggering conditions for the mode transitions, find it hard to react to such mode changes, which may lead to critical situations where the crews become, for instance, aware that the autopilot carries out unwanted actions; however, such crews do not generally know the procedure to be applied in order to switch back to the desired piloting mode.

Furthermore, an undetected and un-notified defect of the autopilot can result in the trajectory of the aircraft becoming modified without the crew being notified.

SUMMARY OF THE INVENTION

The present invention aims at overcoming these drawbacks and more specifically, at detecting such piloting conflicts for notifying the crew about it.

To this end, according to the invention, the method for detecting piloting conflicts between the crew and the autopilot of an aircraft wherein an automatic trajectory is programmed, said automatic trajectory being defined by values of navigation parameters desired by the crew of said aircraft, is remarkable in that, sequentially:

a) it is checked whether the actual values of said navigation parameters converge to said corresponding desired values with a predetermined convergence period;

b) in the case where at least one of said actual values does not converge, in said convergence period, on the desired corresponding value, a predictive calculation is carried out, at consecutive future moments, of the value of at least one particular parameter selected from said navigation parameters; and c) in the case where the predicted value of said particular parameter is higher than a corresponding predefined threshold, an alarm is emitted for the crew of said aircraft so as to notify them about a piloting conflict being able to jeopardize the flight safety of said aircraft.

Thus, the method of the invention allows piloting conflicts to be detected between the crew and the autopilot of the aircraft with no need to model them or define them a priori. In the implementation of the method according to the present invention, said predictive calculation of said particular parameter could be carried out in any known way, for instance through a Kalman filter or particle filter device.

In addition, even in the case of an undetected breakdown of the autopilot, the crew is notified that the aircraft is not following the desired automatic trajectory.

Advantageously, said alarm for the crew comprises a piece of information on the origin of said piloting conflict.

Thus, by means of such a relevant piece of information, the crew is able to react appropriately to the piloting conflict for returning back to a secured normal situation.

According to the invention, said check a) preferably implements the model of the piloting mode transitions associated with said autopilot and of the equations of the typical flight mechanics for said aircraft.

This invention also relates to a device for implementing the above mentioned method. Such a device on board an aircraft provided with an autopilot wherein an automatic trajectory is programmed, said automatic trajectory being defined by values of navigation parameters desired by the crew of said aircraft, is remarkable in that it comprises:

checking means, receiving the desired values of said navigation parameters as well as the corresponding actual values, for checking that said actual values converge on said corresponding desired values within a predetermined convergence period;

calculation means, receiving the actual value of at least one particular parameter selected amongst said parameters relative to the navigation, for carrying out a predictive calculation of the value of said particular parameter at consecutive future moments, in the case where said checking means detect the absence of convergence of at least one of said actual values, within said convergence period, on the corresponding desired value;

comparison means, receiving the predicted value of said particular parameter, for comparing it with a corresponding predefined threshold; and alarming means for emitting an alarm for the crew, in the case where said comparison means detect that said predicted value is higher than said corresponding predefined threshold.

This invention further relates to an aircraft. Such an aircraft is remarkable in that it comprises the above mentioned device.

BRIEF DESCRIPTION OF THE DRAWINGS

The figures of the appended drawing will better explain how this invention can be implemented. In such figures, identical reference numerals relate to similar components.

DETAILED DESCRIPTION

Figure 1:
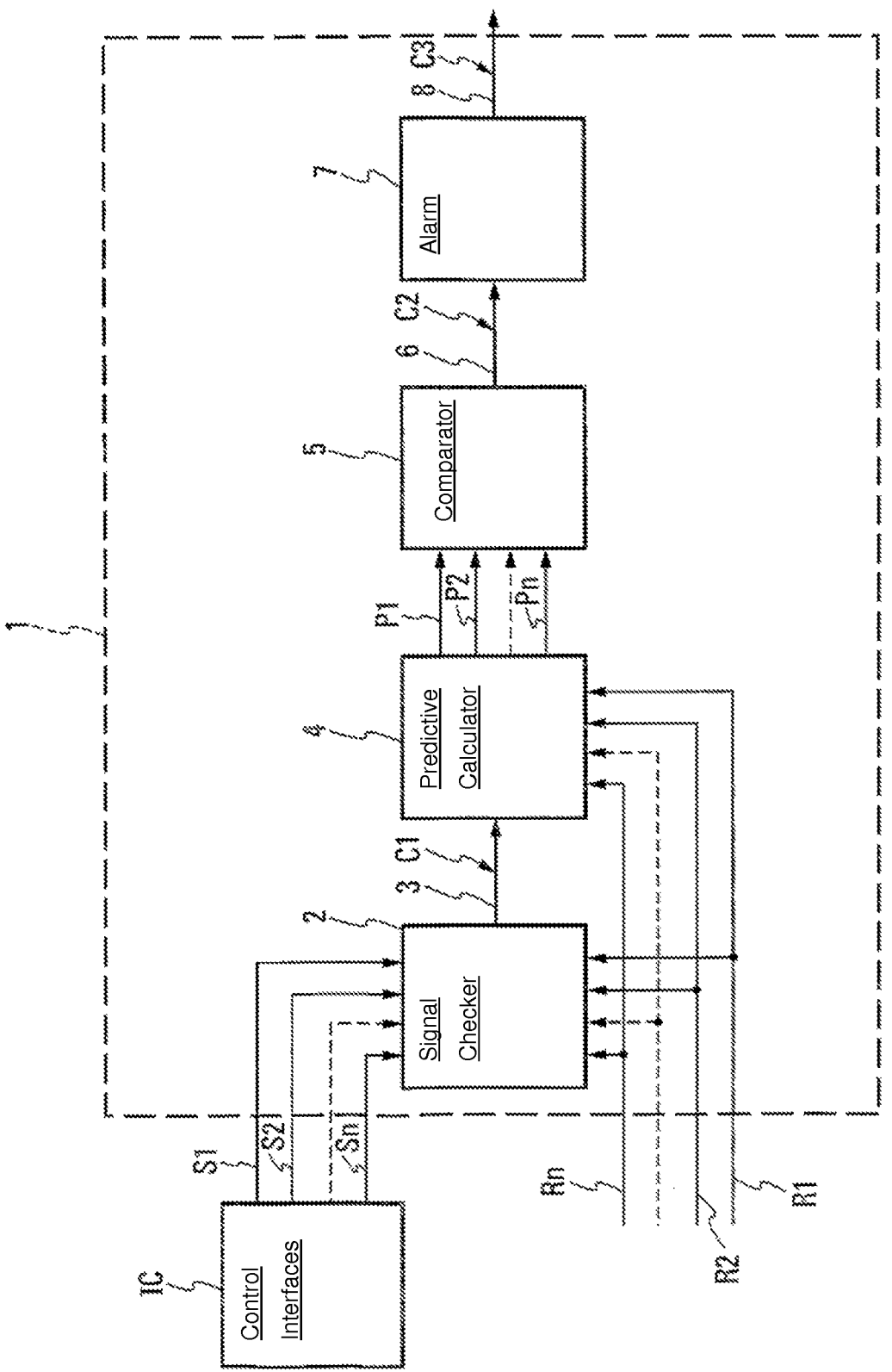
FIG. 1 schematically illustrates, as a block diagram, a particular embodiment of this invention.

On FIG. 1, there is illustrated the block diagram of an examplary device 1 implementing the invention and mounted on board an aircraft (not shown).

Moreover, there are schematically illustrated the control interfaces CI of the autopilot of the aircraft. The autopilot is able to generate piloting orders for the aircraft (not shown), from a trajectory being desired by the pilots and that they have programmed in said autopilot from the control interfaces CI under the form of desired values of navigation parameters (for instance the speed, the altitude, the course, etc.).

The device 1 comprises, amongst others:
checking means 2 receiving signals S1, S2, Sn being representative of the values of the navigation parameters desired by the pilots, coming from the control interfaces CI of the autopilot, and signals R1, R2, Rn representative of the actual values of these same parameters coming from measurement means (not shown). From the model of the piloting mode transitions being associated with the autopilot and from the equations of the flight mechanics specific for the aircraft, the checking means 2 are able to periodically check (according to a predefined period) that each one of the actual values converges on the corresponding desired value within a predetermined convergence period. When at least one of the actual values does not converge on the corresponding desired value within such a convergence period, the checking means 2 are able to generate, at the output thereof 3, a signal C1 representative of the absence of convergence of at least one of the actual values;

calculation means 4 receiving all the signals R1, R2, Rn and being activated by the signal C1. Thus, when the signal C1 appears at the output 3 of the checking means 2, the calculation means 4 are able to carry out a predictive calculation, at consecutive future moments, of the value of some of said navigation parameters, being preferably different from the parameter(s), the actual values of which do not converge. Of course, it could be contemplated that the calculation means are able, by means of a Kalman filter or particle filter device, to carry out a predictive calculation of the value of all the navigation parameters, or even of one single correctly selected parameter. The calculation means 4 are then able to deliver in output signals P1, P2, Pn representative of the predicted values;

comparison means 5, receiving signals P1, P2, Pn, are activated by the latter. Thus, when the signals P1, P2, Pn appear in output of the calculation means 4, the comparison means 5 are able to compare each one of the predicted values (associated with signals P1, P2, Pn) with a corresponding predefined threshold. When at least one of said predicted values exceeds the corresponding threshold, the comparison means 5 are able to generate, at the output thereof 6, a signal C2 representative of the fact that a piloting conflict between the autopilot and the pilots of the aircraft is caused to jeopardize the flight safety and there is a risk for the aircraft:
either exceeding its desired flight level;
or deviating from its desired horizontal trajectory;
or exiting from the flight field;
or colliding the ground or another aircraft;
etc.

Moreover, the signal C2 can advantageously comprise information representative of the navigation parameter(s), the unexpected predicted values of which are at the origin of the piloting conflict; and
alarming means 7 controlled by said signal C2.

Thus, when the signal C2 appears at the output 6 of the comparison means 5 (meaning that a piloting conflict is caused to jeopardize the flight safety of the aircraft), the alarming means 7 are able to emit, for the pilots, a sound alarm in the cockpit of the aircraft and a visual alarm on the piloting interfaces. Advantageously, according to the invention, from the information contained in the signal C2, the alarming means 7 are also able to deliver, at the output 8 thereof, a signal C3 representative of relevant information specifying, for instance, the parameter(s), the predicted values of which involve jeopardizing the flight safety of the aircraft. Such relevant information can then occur on the piloting interfaces of the aircraft so that the pilots are able to become aware of the origin of the piloting conflict and thus carry out the appropriate steps so as to return back to a secured normal situation.

Figure 2:
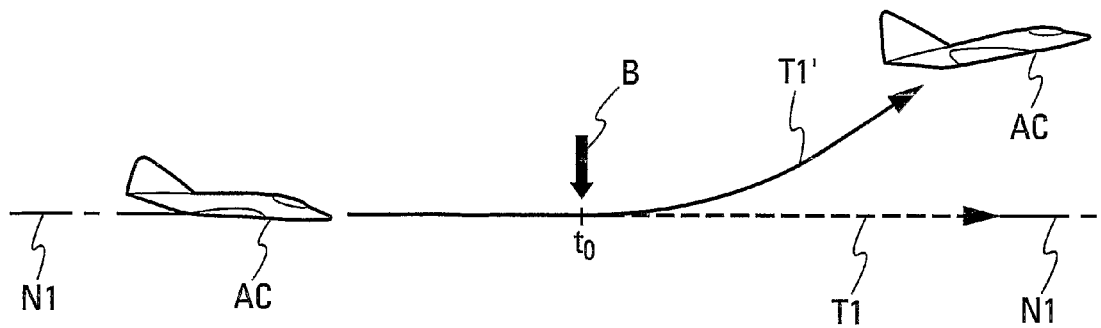
FIGS. 2 and 3 illustrate two exemplary embodiments of the invention.
Figure 3:
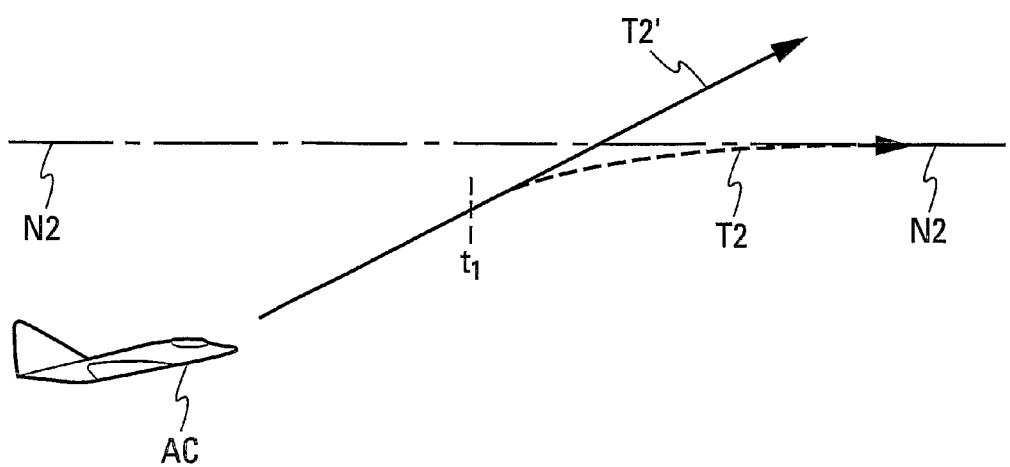

FIGS. 2 and 3 illustrate two situations (amongst others not shown) wherein the present invention helps to improve the safety of the air traffic.

FIG. 2 shows an aircraft AC having arranged on board the previously described device 1. The aircraft AC is then at a flight level of altitude N1 (for instance higher than 35,000 feet) and its autopilot is connected so as to check the corresponding automatic trajectory T1. At the moment $t_0$, under the effect of a turbulence (symbolized by the arrow B), the speed of the aircraft AC increases until the authorized maximum speed is exceeded, resulting in the autopilot being disconnected and the aircraft AC starting to nose up. In such a situation, the device 1 detects that the actual values of some navigation parameters (for instance for maintaining the flight level of altitude N1) does not converge on the corresponding values desired by the pilots. The device 1 according to this invention is then able to predict that the new trajectory T1 jeopardizes the safety of the aircraft AC making it change its flight level. It then notifies the pilots about such an event being able to jeopardize the flight safety while transmitting them information about the origin of the trajectory change.

In the example of FIG. 3, the aircraft AC is in a climbing phase in a given piloting mode for reaching the altitude N2 and the autopilot is connected so as to control the corresponding automatic trajectory T2. At the moment $t_1$, for some reason, an undetected breakdown of the autopilot (for instance a channel loss of the flight control unit FCU) causes the aircraft AC to continue its climbing phase exceeding the altitude N2. In such a situation, the device 1 detects that the actual values of some navigation parameters (for instance for reaching, and then holding the flight level of altitude N2) do not converge on the corresponding values desired by the pilots. The device 1 is then able to predict that the new trajectory T2' jeopardizes the safety of the aircraft AC making it change its flight level. It then notifies the crew about such a critical situation while informing them about the origin of the change of the initially programmed trajectory.

The invention claimed is:

1. A method for detecting piloting conflicts between the crew and the autopilot of an aircraft (AC), wherein an automatic trajectory (T1, T2) is programmed, said automatic trajectory (T1, T2) being defined by values of navigation parameters desired by the crew of said aircraft (AC), comprising sequentially:
    a) checking via a processor whether the actual values of said navigation parameters converge on said corresponding desired values within a predetermined convergence period;
    b) in the case where at least one of said actual values does not converge, within said convergence period, on the corresponding desired value, a predictive calculation is carried out via a processor, at consecutive future moments, of the value of at least one particular parameter selected amongst said navigation parameters, wherein the at least one particular parameter corresponds to a different navigation parameter than does the at least one of said actual values that does not converge; and
    c) in the case where the predicted value of said particular parameter is higher than a corresponding predefined threshold, an alarm is emitted for the crew of said aircraft (AC) so as to notify them about a piloting conflict being able to jeopardize the flight safety of said aircraft (AC), wherein said alarm for the crew comprises a piece of information on the origin of said piloting conflict, and wherein the piloting conflict is not predefined.

2. The method according to claim 1, wherein said checking a) implements the model of transitions of piloting modes associated with said autopilot and of equations of the flight mechanics being typical of said aircraft (AC).

3. A device for implementing the method as specified according to claim 1, on board an aircraft (AC) provided with an autopilot, where an automatic trajectory (T1, T2) is programmed, said automatic trajectory (T1, T2) being defined by values of navigation parameters desired by the crew of said aircraft (AC), comprising:
    checking means (2), receiving the desired values of said navigation parameters as well as the corresponding actual values, for checking that said actual values converge on said corresponding desired values within a predetermined convergence period;
    calculation means (4), receiving the actual values of at least one particular parameter selected amongst said navigation parameters, for carrying out a predictive calculation, in the case where said checking means detect the absence of convergence of at least one of said actual values, within said convergence period, wherein the predictive calculation is carried out, at consecutive future moments, for the value of at least one particular parameter selected amongst said navigation parameters, and wherein the at least one particular parameter corresponds to a different navigation parameter than does the at least one of said actual values that does not converge;
    comparison means (5), receiving the predicted value of said particular parameter, for comparing it with a corresponding predefined threshold; and
    alarming means (7) for emitting an alarm for the crew, in the case where said comparison means (5) detect that said predicted value is higher than said corresponding predefined threshold, wherein said alarm for the crew comprises a piece of information on the origin of said piloting conflict, and wherein the piloting conflict is not predefined.

4. An aircraft comprising a device (1) such as specified according to claim 3.

* * * * *